(12) United States Patent
Segawa et al.

(10) Patent No.: US 10,462,308 B2
(45) Date of Patent: Oct. 29, 2019

(54) RIP TIME ESTIMATION METHOD

(71) Applicant: SCREEN HOLDINGS CO., LTD., Kyoto (JP)

(72) Inventors: Hiroyuki Segawa, Kyoto (JP); Kenichi Yokouchi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/117,861

(22) Filed: Aug. 30, 2018

(65) Prior Publication Data

US 2019/0068798 A1  Feb. 28, 2019

(30) Foreign Application Priority Data

Aug. 31, 2017  (JP) ................. 2017-166538

(51) Int. Cl.
*H04N 1/00* (2006.01)
*G06F 3/12* (2006.01)

(52) U.S. Cl.
CPC ....... *H04N 1/00015* (2013.01); *G06F 3/1208* (2013.01); *G06F 3/1234* (2013.01); *H04N 1/00031* (2013.01); *H04N 1/00039* (2013.01)

(58) Field of Classification Search
None
See application file for complete search history.

(56) References Cited

U.S. PATENT DOCUMENTS

| | | | | |
|---|---|---|---|---|
| 6,407,821 B1* | 6/2002 | Hohensee | ............. | G06F 3/1213 358/1.15 |
| 7,020,837 B1* | 3/2006 | Kueny | ................... | H03M 7/30 715/234 |
| 2010/0094821 A1* | 4/2010 | Felderman | .......... | G06F 17/3092 707/705 |
| 2014/0085657 A1 | 3/2014 | Segawa et al. | | |

FOREIGN PATENT DOCUMENTS

| JP | 2002-182875 A | 6/2002 |
|---|---|---|
| JP | 2014-067217 A | 4/2014 |

* cited by examiner

*Primary Examiner* — Thomas D Lee
(74) *Attorney, Agent, or Firm* — McDermott Will & Emery LLP

(57) ABSTRACT

A file generation method for generating, based on an original file in a PDF format, a new file in a PDF format having a larger number of pages than the original file includes a reuse information creation step of creating, by taking the original file or a duplicate of the original file as one initial file and analyzing the initial file, reuse information for allowing specification of whether a use state of each resource is a shared state or a non-shared state, and a page duplication step of generating a page that constitutes the new file, by performing, based on the reuse information, duplication of a page in the initial file in such a way that the use state of each resource is same before duplication and after duplication.

8 Claims, 21 Drawing Sheets

Fig.7

```
TotalPage=4
TotalForm=5
TotalImage=1

SerialNumber=1
XObjectID=1
XObjectType=Image
RecycleCount=2
ExecCountList=[1 1][2 1]  ←──── 65
ParentXObjectNum=2

SerialNumber=2
XObjectID=2
XObjectType=Form
RecycleCount=2
ExecCountList=[3 1][4 1]
ParentXObjectNum=2

SerialNumber=3
XObjectID=11
XObjectType=Form
RecycleCount=1
ExecCountList=[1 1]
ParentXObjectNum=0
```

6a, 6b, 6c

— DUPLICATION DESTINATION PAGE

— DUPLICATION DESTINATION PAGE

— DUPLICATION DESTINATION PAGE

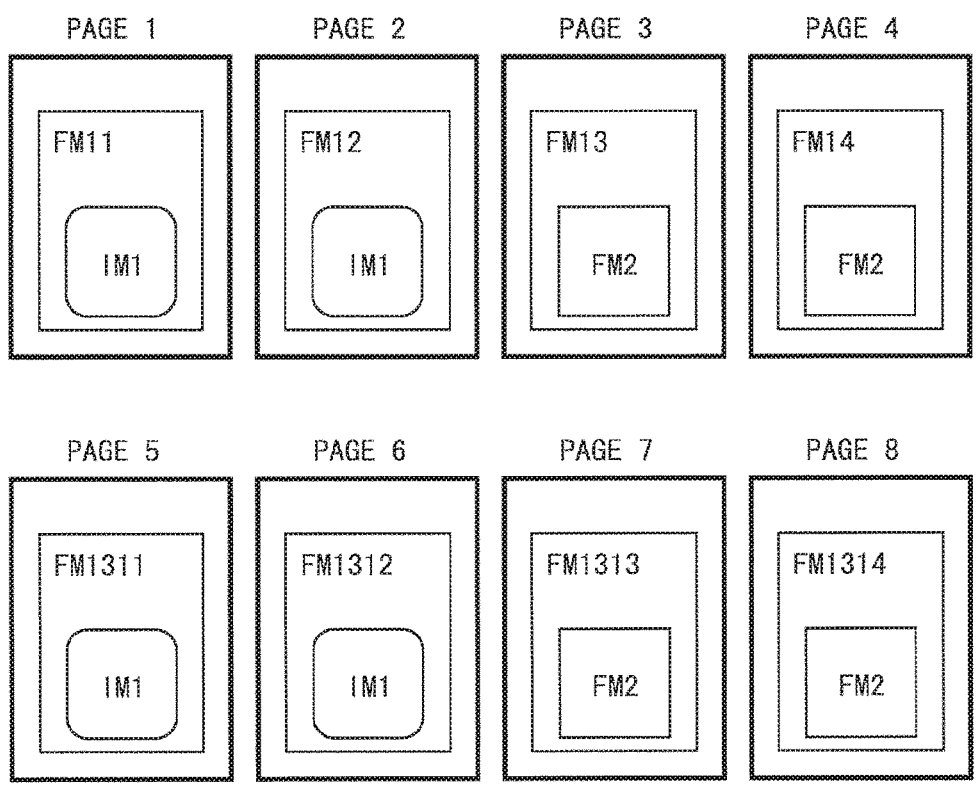

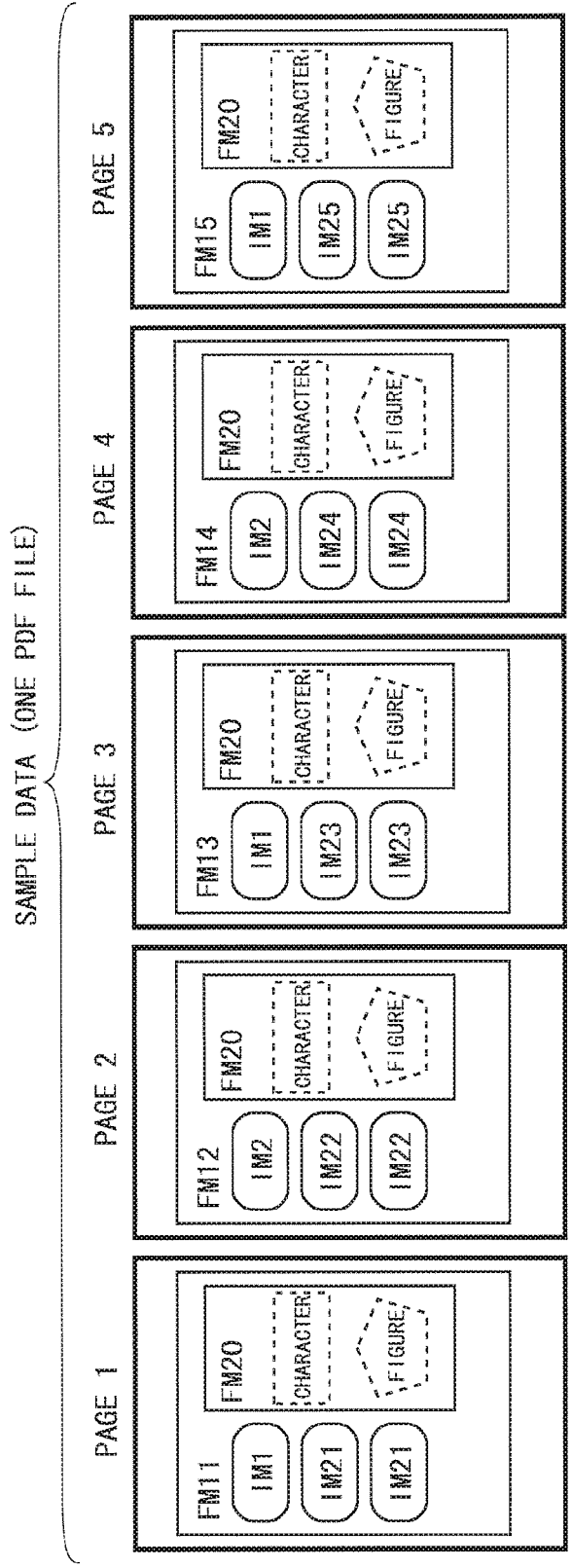

Fig.19

TotalPage=5
TotalForm=6
TotalImage=7

SerialNumber=1
XObjectID=11
XObjectType=Form
RecycleCount=1
ExecCountList=[1 1]
ParentXObjectNum=0

SerialNumber=2
XObjectID=12
XObjectType=Form
RecycleCount=1
ExecCountList=[2 1]
ParentXObjectNum=0

SerialNumber=3
XObjectID=13
XObjectType=Form
RecycleCount=1
ExecCountList=[3 1]
ParentXObjectNum=0

SerialNumber=4
XObjectID=14
XObjectType=Form
RecycleCount=1
ExecCountList=[4 1]
ParentXObjectNum=0

SerialNumber=5
XObjectID=15
XObjectType=Form
RecycleCount=1
ExecCountList=[5 1]
ParentXObjectNum=0

SerialNumber=6
XObjectID=20
XObjectType=Form
RecycleCount=5
ExecCountList=[1 1][2 1][3 1][4 1][5 1]
ParentXObjectNum=5

SerialNumber=7
XObjectID=1
XObjectType=Image
RecycleCount=3
ExecCountList=[1 1][3 1][5 1]
ParentXObjectNum=3

SerialNumber=8
XObjectID=2
XObjectType=Image
RecycleCount=2
ExecCountList=[2 1][4 1]
ParentXObjectNum=2

SerialNumber=9
XObjectID=21
XObjectType=Image
RecycleCount=2
ExecCountList=[1 2]
ParentXObjectNum=1

SerialNumber=10
XObjectID=22
XObjectType=Image
RecycleCount=2
ExecCountList=[2 2]
ParentXObjectNum=1

SerialNumber=11
XObjectID=23
XObjectType=Image
RecycleCount=2
ExecCountList=[3 2]
ParentXObjectNum=1

SerialNumber=12
XObjectID=24
XObjectType=Image
RecycleCount=2
ExecCountList=[4 2]
ParentXObjectNum=1

SerialNumber=13
XObjectID=25
XObjectType=Image
RecycleCount=2
ExecCountList=[5 2]
ParentXObjectNum=1

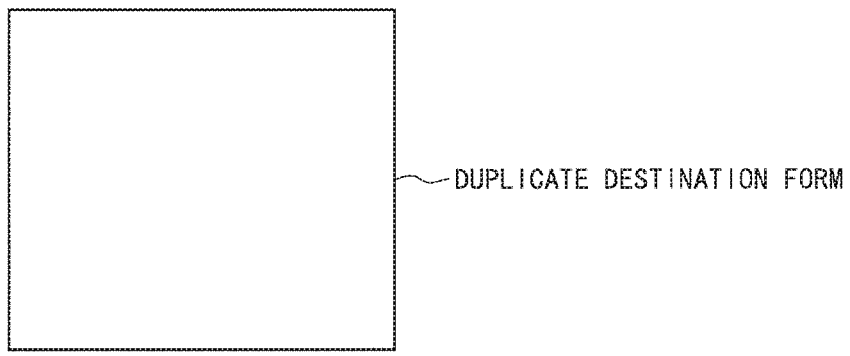
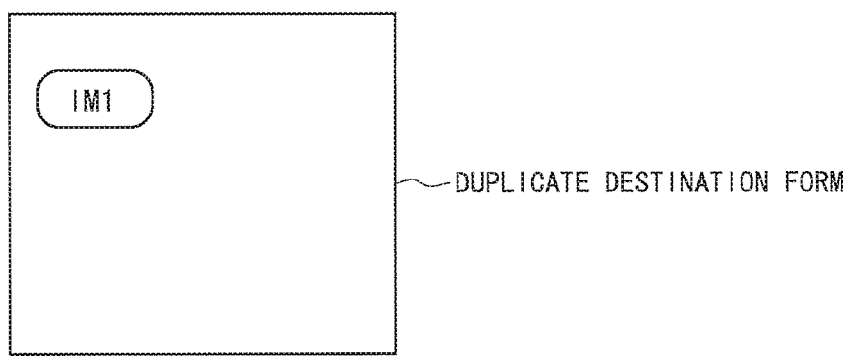
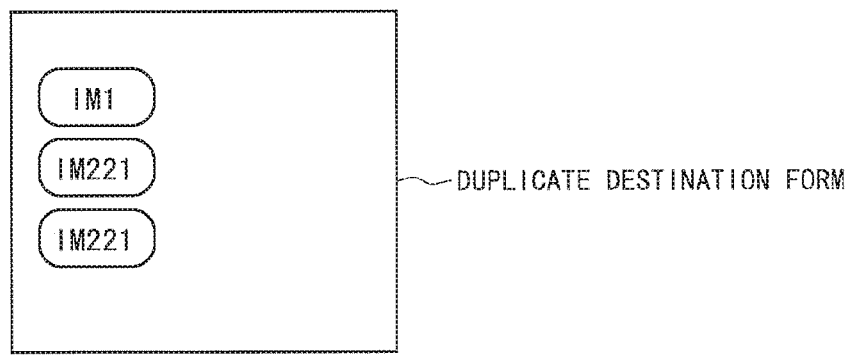

RIP TIME ESTIMATION METHOD

BACKGROUND OF THE INVENTION

Field of the Invention

The present invention relates to a file generation method for generating a new file with a larger number of pages than an original file by performing duplication of a page in the file.

Description of Related Art

Conventionally, in a printing system which performs processing by a workflow, first, edit processing which uses components constituting a printed material is performed by using a computer (such as a personal computer) called a front-end, and page data describing a print target by a page description language or the like is created. Next, RIP processing (rasterization processing) is performed on the page data. The page data is thereby converted into print data which is image data in a bitmap format representing an image to be printed. Then, the print data is transmitted to a digital printer, and printing is performed at the digital printer based on the print data. Alternatively, a printing plate is made by a plate making device by using the print data, and printing is performed by a plate printing machine by using the printing plate.

Conventionally, in such a printing system, time required for the RIP processing (hereinafter simply referred to as "RIP time") is predicted in order to efficiently use resources of a printer or the like. With respect to this point, Japanese Laid-Open Patent Publication No. 2014-67217 discloses a technique of accurately predicting the RIP time by taking into account a reuse state or a nested relationship of reusable components included in page group data. Japanese Laid-Open Patent Publication No. 2014-67217 describes generation of new target data by performing duplication of pages in original target data in the case where the number of pages of target data (sample data) used for prediction of the RIP time is small. Furthermore, Japanese Laid-Open Patent Publication No. 2002-182875 discloses a technique for performing efficient scheduling based on prediction of the RIP time and print processing time for each of a plurality of jobs. In a printing system described in Japanese Laid-Open Patent Publication No. 2002-182875, the RIP time is calculated by adding together "time TS determined based on time required for execution of each drawing command and the number of commands of each drawing command" and "time TG determined based on a size of each figure and processing time for each unit size".

In recent years, variable data printing of printing, in a predetermined format, different contents on a per page basis is often performed. It should be noted that variable data printing is performed by using a digital printer, without making a printing plate. With respect to such variable data printing, test printing is sometimes performed using sample data with a small number of pages (sample data of several pages). However, if the number of pages of sample data is too small, the RIP time for the RIP processing using actual data is not accurately predicted. Accordingly, the number of pages constituting the sample data (which is assumed here to be one PDF file) has to be increased.

A description is given of a drawing object (hereinafter simply referred to as a "component") constituting a PDF file. As shown in FIG. 26, internally, a PDF file includes a part which holds content data and a part which holds resources. Components are roughly divided into components (such as characters and lines) which are directly embedded as content data in the PDF file, and components which are held as resources so as to be reusable in the PDF file. The present specification focuses only on forms and images among those held as resources. It should be noted that forms and images are defined as "XObject" in the PDF file.

As shown in FIG. 27, a form may be arranged within a form. Moreover, as shown in FIG. 28, an image may be arranged within a form. Furthermore, components (such as characters and lines) other than resources may be arranged within a form. Furthermore, a form, an image, and components other than resources may be arranged in a form in any numbers.

As shown in FIG. 29, a form, an image, and the like may be arranged on a page constituting a PDF file. More specifically, a form, an image, and components other than resources as described above may be arranged on a page constituting a PDF file in any numbers.

A resource may be used as a component in one file any number of times. In the present specification, a state where a resource is used as a component in one file a plurality of times is referred to as a "shared state", and a state where the resource is used as a component in one file only one time is referred to as a "non-shared state". In the example shown in FIG. 26, a form B as a resource is shared by data of a component denoted by a reference sign 91 and data of a component denoted by a reference sign 92. That is, a use state of the form B is the shared state. In the case where there are two files which are seemingly the same when viewed by a viewer or the like, data structures of the two files are possibly different, depending on the use states (shared state/non-shared state) of resources in the respective files.

As described above, in the case where the number of pages of sample data is small, the number of pages of the sample data has to be increased to accurately predict the RIP time. For example, data of ten thousand or more pages is sometimes necessary to accurately predict the RIP time. A conventional method of increasing the number of pages is described in the following. A description is given of an example of increasing the number of pages of a file by two times. Moreover, the sample data (one PDF file) here is assumed to be structured as shown in FIG. 30. It should be noted that a form is denoted by a reference sign beginning with "FM", and an image is denoted by a reference sign beginning with "IM". Of the reference signs assigned to the forms and images, parts excluding "FM", "IM" are unique numbers for identifying respective resources (or more specifically, unique numbers for identifying individual XObjects) (hereinafter referred to as a "resource identification number"). For example, a component indicated by a reference sign FM14 in FIG. 30 is a form, and its resource identification number is 14. Moreover, a component indicated by a reference sign IM1 in FIG. 30 is an image, and its resource identification number is 1.

In the example shown in FIG. 30, an image IM1 and a form FM2 are each used twice, and a form FM11, a form FM12, a form FM13, and a form FM14 are each used only once. Accordingly, the use state is the shared state for the image IM1 and the form FM2, and the use state is the non-shared state for the form FM11, the form FM12, the form FM13, and the form FM14.

First, as a first conventional technique, a technique of using a page insertion menu of certain software for editing a PDF file will be described. According to the first conventional technique, a duplicate file of sample data, i.e., a PDF file shown in FIG. 30, is prepared, and the duplicate file is inserted in the PDF file shown in FIG. 30 by using the page insertion menu. A file having a structure as shown in FIG. 31 is thereby generated. According to the first conventional technique, regarding the generated file, images IM142 on page 5 and page 6 and the images IM1 on page 1 and page 2 are different resources (see FIG. 31). Furthermore, forms FM162 included in a form FM1313 of page 7 and a form FM1314 on page 8 and forms FM2 included in the form FM13 on page 3 and the form FM14 on page 4 are different resources (see FIG. 31). However, in such a case, in actual data, it is considered that the image IM1 is normally reused on page 5 and page 6, and that the form FM2 is normally reused on page 7 and page 8. Accordingly, the data structure of a file which is obtained by increasing the number of pages by using the first conventional technique is different from the data structure of a file storing the actual data. Therefore, the RIP time cannot be accurately estimated by using a file which is obtained by the first conventional technique.

Next, as a second conventional technique, a technique of using a menu, of certain software for editing a PDF file, for copying a page will be described. According to the second conventional technique, each page included in sample data, i.e., the PDF file shown in FIG. 30, is duplicated by using the menu for copying a page. A file having a structure as shown in FIG. 32 is thereby generated. According to the second conventional technique, regarding the generated file, a form FM11 on page 1 and a form FM11 on page 5 are the same resource (see FIG. 32). In this manner, the use state of a resource, the use state of which is the non-shared state before the number of pages is increased, is the shared state after the number of pages is increased. In such a case, it is considered that, in actual data, the form on the page 1 and the form on page 5 are normally used only once. Accordingly, the data structure of a file which is obtained by increasing the number of pages by using the second conventional technique is also different from the data structure of a file storing the actual data. Therefore, the RIP time cannot be accurately estimated by using a file which is obtained by the second conventional technique.

SUMMARY OF THE INVENTION

An object of the present invention is to provide a method for generating a PDF file which enables accurate estimation of RIP time, from a PDF file with a small number of pages.

To achieve the object, the present invention includes the following features.

An aspect of the present invention is a file generation method for generating, based on an original file in a PDF format, a new file in a PDF format having a larger number of pages than the original file, the method including:

a reuse information creation step of creating, by taking the original file or a duplicate of the original file as an initial file and analyzing the initial file, reuse information for allowing specification of whether a use state of each resource held in the initial file is a shared state of being used as a component in one file a plurality of times or a non-shared state of being used as a component in one file only once; and a page duplication step of generating a page that constitutes the new file, by performing, based on the reuse information, duplication of a page in the initial file in such a way that the use state of each resource is same before duplication and after duplication.

According to such a configuration, in the case where data with a small number of pages is used as test sample data (PDF file) in a printing system, for example, the number of pages of the sample data can be increased. At this time, the reuse information for specifying the use state of each resource is created by analyzing the initial file, which is the original file itself or a duplicate of the original file (sample data). Then, a page which constitutes the new file is generated by performing, based on the reuse information, duplication of a page in the initial file in such a way that the use state of each resource is the same before duplication and after duplication. That is, the use state of a resource, the use state of which before duplication is the shared state, remains the shared state after duplication, and the use state of a resource, the use state of which before duplication is the non-shared state, remains the non-shared state after duplication. Accordingly, the new file has a data structure similar to that of a file storing actual data. Accurate prediction of RIP time using the new file is enabled by performing duplication of the page in the initial file until the number of pages of the new file is such that estimation of the RIP time is enabled. As described above, a PDF file enabling accurate estimation of the RIP time can be generated from a PDF file with a small number of pages.

Another aspect of the present invention is a computer-readable recording medium having recorded therein a file generation program for generating, based on an original file in a PDF format, a new file in a PDF format having a larger number of pages than the original file, wherein the file generation program causes a computer to execute:

a reuse information creation step of creating, by taking the original file or a duplicate of the original file as the initial file and analyzing the initial file, reuse information for allowing specification of whether a use state of each resource held in the initial file is a shared state of being used as a component in one file a plurality of times or a non-shared state of being used as a component in one file only once; and a page duplication step of generating a page that constitutes the new file, by performing, based on the reuse information, duplication of a page in the initial file in such a way that the use state of each resource is same before duplication and after duplication.

These and other objects, features, modes, and advantageous effects of the present invention will be made further apparent from the appended drawings and the detailed description of the present invention given below.

BRIEF DESCRIPTION OF THE DRAWINGS

FIG. 7 is a diagram showing a part of data (reuse information) that is stored in a reuse database according to the embodiment.

FIG. 17 is a diagram for describing the first specific example of the file generation process according to the embodiment.

FIG. 18 is a diagram for describing a second specific example of the file generation process (example of increasing the number of pages from five to ten) according to the embodiment.

FIG. 19 is a diagram showing reuse information corresponding to data shown in FIG. 18, according to the embodiment.

FIG. 20 is a diagram for describing the second specific example of the file generation process according to the embodiment.

FIG. 21 is a diagram for describing the second specific example of the file generation process according to the embodiment.

FIG. 22 is a diagram for describing the second specific example of the file generation process according to the embodiment.

DETAILED DESCRIPTION OF PREFERRED EMBODIMENTS

Hereinafter, an embodiment of the present invention will be described with reference to the appended drawings.

1. Overall System Configuration

Figure 1:
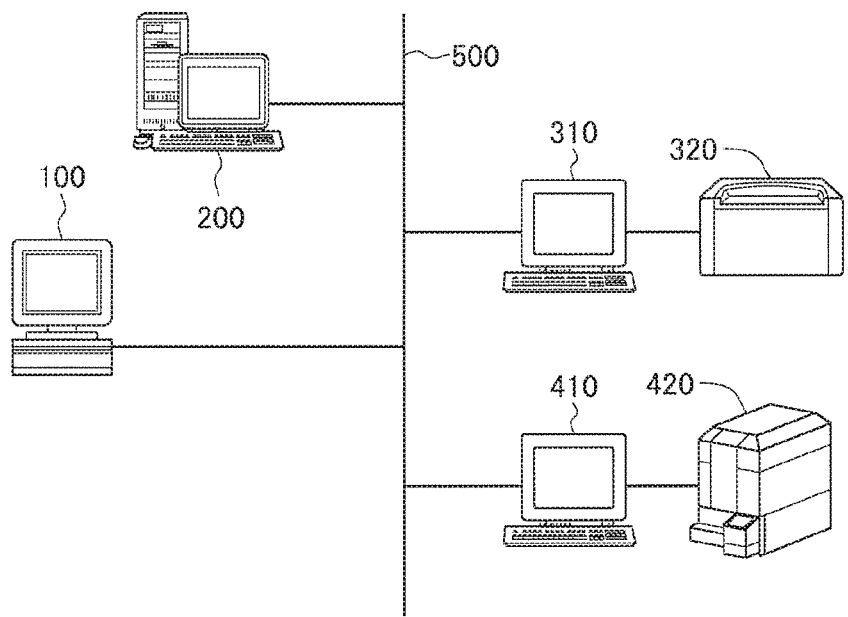
FIG. 1 is an overall configuration diagram of a printing system according to an embodiment of the present invention.

FIG. 1 is an overall configuration diagram of a printing system according to an embodiment of the present invention. The printing system includes a client computer (computer called "front-end") 100 for performing edit processing using components and the like constituting a printed material, a print data processing device 200 configured to apply data processing such as RIP processing on submission data, a platemaking device 320 such as a plate recorder and a controller 310 thereof, and a digital printer 420 and a controller 410 thereof. The client computer 100, the print data processing device 200, the controller 310 of the platemaking device 320, and the controller 410 of the digital printer 420 are communicably interconnected by a communication network 500 such as a LAN. However, a configuration where these units are not connected by a communication network may also be adopted.

Printing by the printing system is performed schematically in the following manner. First, in the client computer 100, a PDF file describing a print target by a page description language is created by performing an edit task, a layout task or the like. The PDF file created by the client computer 100 is given to the print data processing device 200 as submission data. At the print data processing device 200, the submission data is subjected to data processing such as RIP processing. Print data (image data) in a bitmap format is thereby generated. Then, in the case where the print data is sent to the controller 310, a printing plate is made by the platemaking device 320 under control of the controller 310. In the case where the print data is sent to the controller 410, printing is performed by the digital printer 420 under control of the controller 410.

Figure 2:
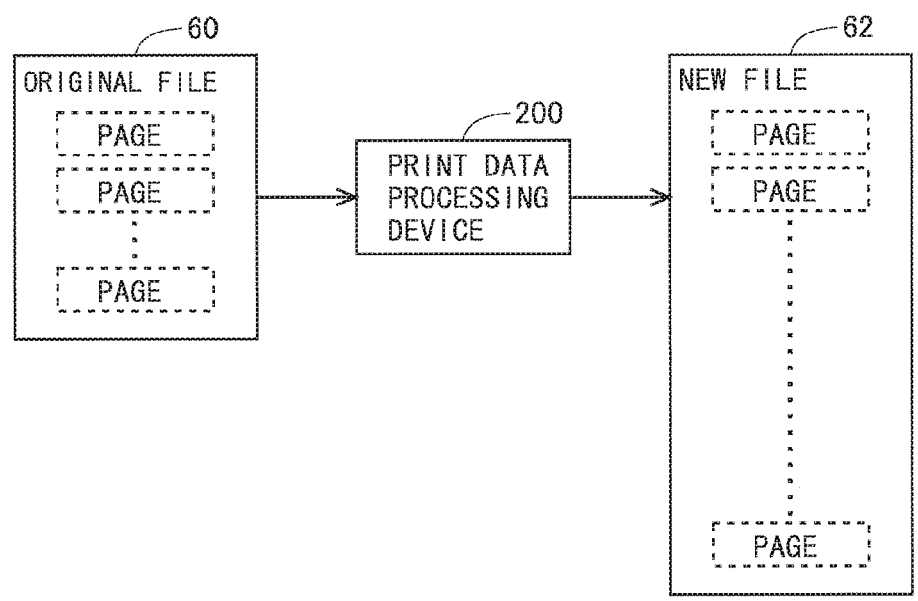
FIG. 2 is a diagram for describing a process (file generation process) which is performed by a print data processing device according to the embodiment.

In the printing system, test printing is sometimes performed before printing is performed using actual data. With respect to this point, in the present embodiment, in the case where data with a small number of pages is used as test sample data (typically, test sample data for execution of variable data printing), a process of increasing the number of pages of the sample data (PDF file) is performed at the print data processing device 200 in order to accurately predict RIP time. That is, the print data processing device 200 performs, based on an original file 60 in a PDF format, a process of generating a new file 62 (the new file 62 is also a file in a PDF format) with a larger number pages than the original file 60, as shown in FIG. 2. It should be noted that, in the present specification, this process is referred to as a "file generation process" for the sake of convenience.

2. Configuration of Print Data Processing Device

Figure 3:
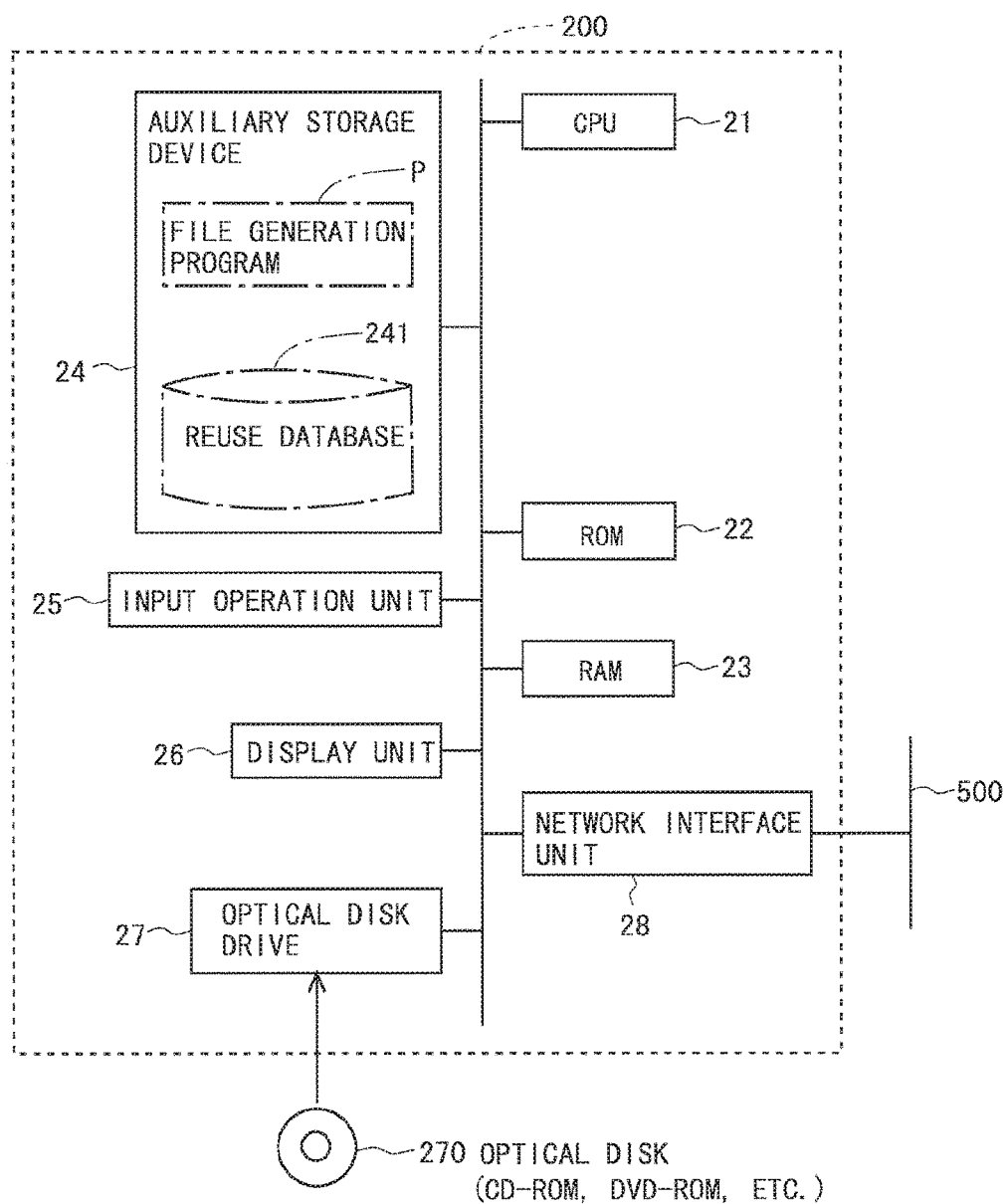
FIG. 3 is a hardware configuration diagram of the print data processing device according to the embodiment.

FIG. 3 is a hardware configuration diagram of the print data processing device 200 according to the present embodiment. The print data processing device 200 is realized by a personal computer, and includes a CPU 21, a ROM 22, a RAM 23, an auxiliary storage device 24, an input operation unit 25 such as a keyboard, a display unit 26, an optical disk drive 27, and a network interface unit 28. The auxiliary storage device 24 stores a file generation program P for executing the file generation process. Furthermore, the auxiliary storage device 24 stores a reuse database 241 for holding reuse information which is created at the time of execution of the file generation process. Submission data and test sample data sent from the client computer 100 via the communication network 500 are inputted into the print data processing device 200 via the network interface unit 28. Print data which is generated at the print data processing device 200 based on the submission data is sent, via the network interface unit 28 and the communication network 500, to the controller 310 of the platemaking device 320 or the controller 410 of the digital printer 420. Furthermore, a file (the new file 62 mentioned above) generated by the file generation process based on the sample data is held in the auxiliary storage device 24, and is used for a process of predicting the RIP time, for example.

As described above, the file generation program P for executing the file generation process is stored in the auxiliary storage device 24. When an instruction to execute the file generation process is issued at the print data processing device 200, the file generation program P is loaded into the RAM 23, and the file generation process is executed by the CPU 21 executing the file generation program P loaded into the RAM 23. The file generation program P is provided being stored in a computer-readable recording medium (non-transitory recording medium), such as a CD-ROM or a DVD-ROM. That is, a user purchases an optical disk (such as a CD-ROM or a DVD-ROM) 270 as a recording medium of the file generation program P, mounts the optical disk in the optical disk drive 27, and reads the file generation program P from the optical disk 270, and installs the file generation program P into the auxiliary storage device 24. Alternatively, the file generation program P sent via the communication network 500 may be received at the network interface unit 28, and be installed in the auxiliary storage device 24.

3. Schematic Flow of File Generation Process

Figure 4:
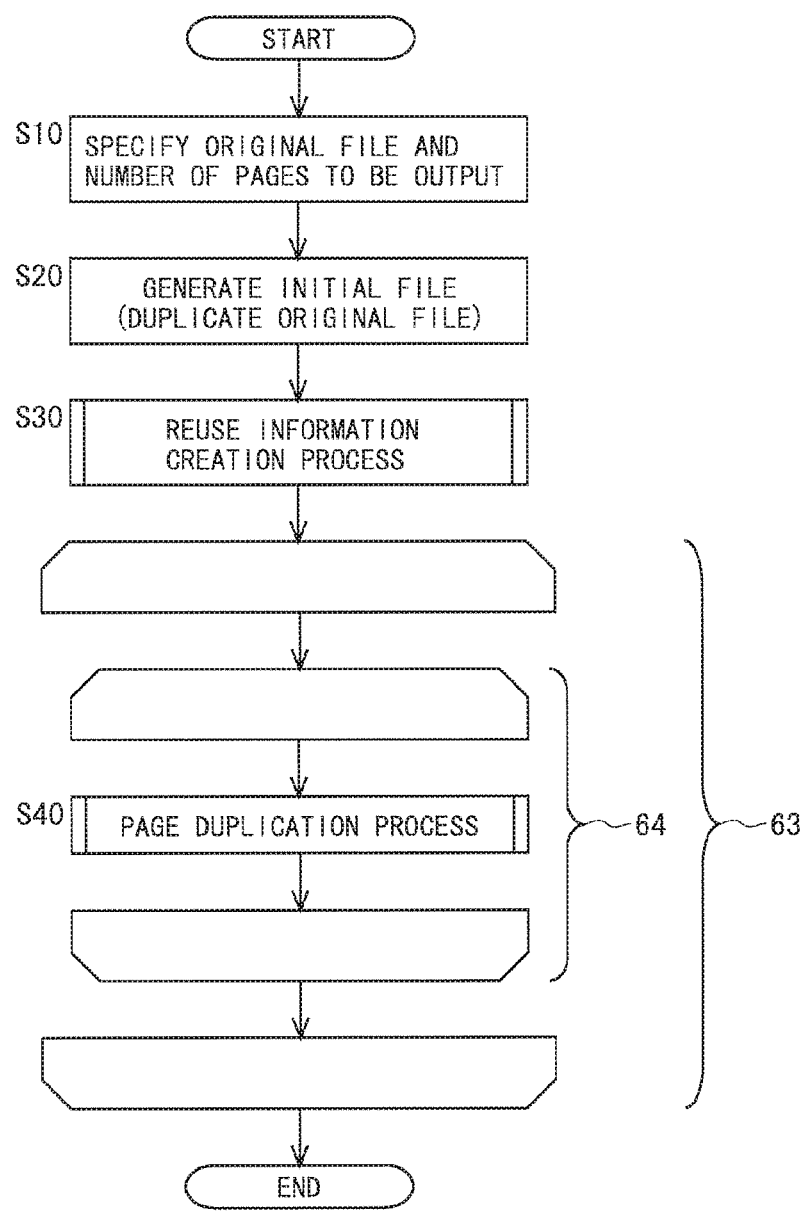
FIG. 4 is a flowchart showing a schematic flow of the file generation process according to the embodiment.

Hereinafter, the file generation process according to the present embodiment will be described. FIG. 4 is a flowchart showing a schematic flow of the file generation process according to the present embodiment. When the file generation process is started, first, the original file 60 and the number of pages after output (i.e., the number of pages of the new file 62) are specified by an operator (step S10). An input from the operator may be received by displaying on the display unit 26 a general dialog allowing specification of a file and input of the number of pages.

Next, by duplicating the original file 60 as it is, an initial file 61, which is an initial state of the new file 62, is generated (see FIG. 5) (step S20). By adding a page after duplication to the initial file 61 at the time of a page duplication process described later, the new file 62 as an output of the file generation process is obtained. It should be noted that, in the case where the original file (such as sample data) 60 does not have to be held in a state before execution of the file generation process, the original file 60 itself may be treated as the initial file 61, without performing the process in step S20.

Next, by analyzing the initial file 61, a process (hereinafter referred to as a "reuse information creation process") of creating reuse information allowing specification of whether a use state of each resource is a shared state (a state where a resource is used as a component in one file a plurality of times) or a non-shared state (a state where a resource is used as a component in one file only once) is performed (step S30). The reuse information created in the reuse information creation process is stored in the reuse database 241. A detailed description of the reuse information creation process will be given later.

Figure 5:
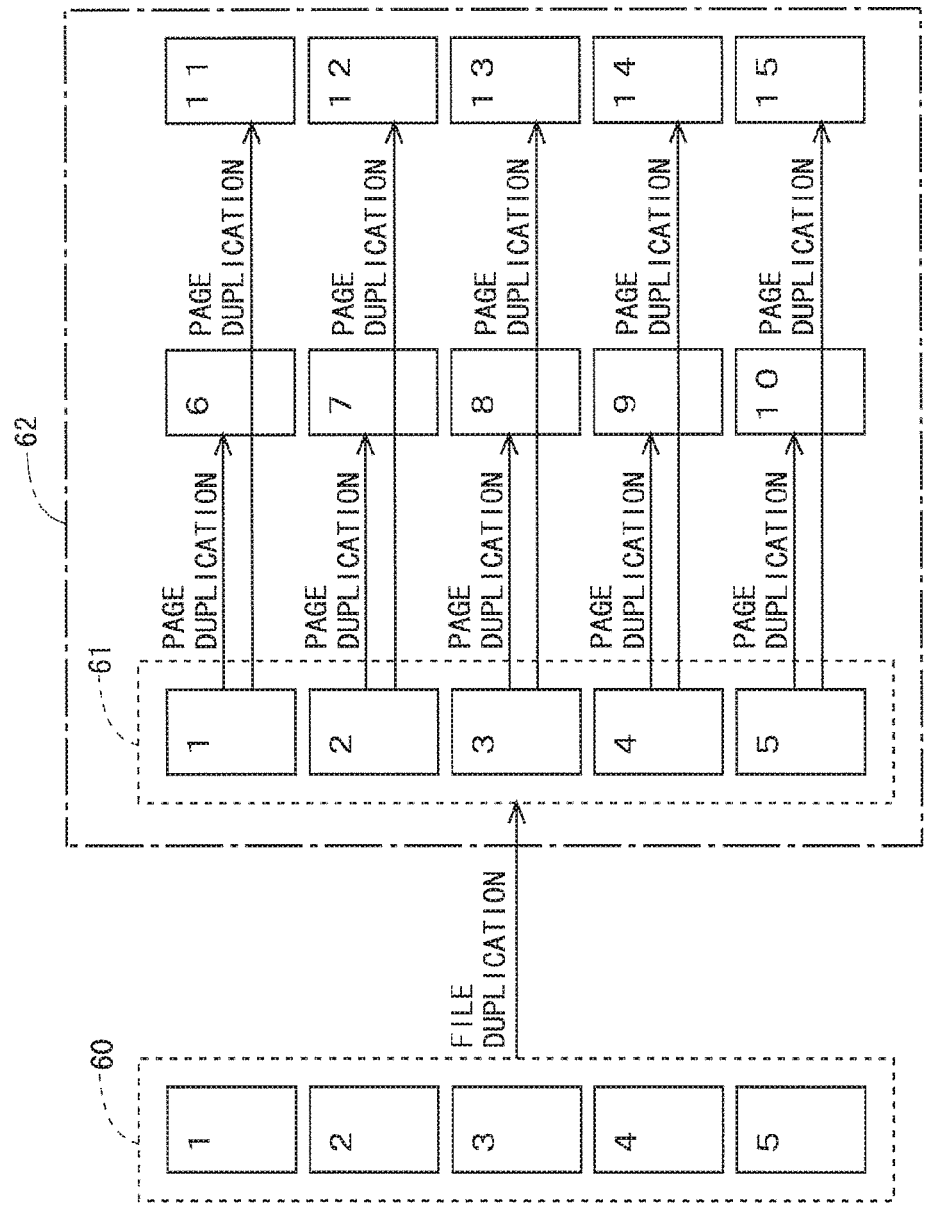
FIG. 5 is a diagram for describing an example of increasing the number of pages from five to fifteen according to the embodiment.

Next, a page duplication process (step S40) of performing duplication of a page in the initial file 61 in order to generate a page which constitutes the new file 62 is repeatedly performed. For example, it is assumed that, in step S10, an original file 60 with five pages is specified, and fifteen is specified as the number of pages of the new file 62. In this case, after an initial file 61 having five pages is generated in step S20, duplication of pages in the initial file 61 is performed as shown in FIG. 5. For example, page 6 of the new file 62 is generated by duplicating page 1 of the initial file 61, and page 14 of the new file 62 is generated by duplicating page 4 of the initial file 61.

To enable the operation as described above, the page duplication process is performed as a process in a double loop as shown in FIG. 4. An outer loop indicated by a reference sign 63 in FIG. 4 is repeated "(number of pages of new file 62/number of pages of original file 60)–1" times. An inner loop indicated by a reference sign 64 in FIG. 4 is repeated the number of times equivalent to the number of pages of the original file 60. It should be noted that the number of pages of the original file 60 is the same as the number of pages of the initial file 61. If the number of pages of the original file 60 is five and the number of pages of the new file is fifteen as in the example described above, the number of repetitions of the outer loop is two, and the number of repetitions of the inner loop is five. Accordingly, the page duplication process in step S40 is performed ten times, and ten pages are added to the initial file 61.

In step S40, duplication of the pages in the initial file 61 is performed based on the reuse information created in step S30 in such a way that the use state of each resource is the same before duplication and after duplication. Accordingly, a component sharing a resource with another component before duplication shares the resource with the other component also after duplication, and a component not sharing a resource with another component before duplication does not share a resource with another component after duplication. The file generation process is ended after the page duplication process (step S40) is repeated a desired number of times by the double loop described above.

It should be noted that, in the present embodiment, it is assumed that only an integer multiple of the number of pages of the original file 60 can be specified in step S10 as the number of pages after output (the number of pages of the new file 62). However, the present invention is not limited to such a case. By causing, at the time of the last loop of the outer loop, the number of repetitions of the inner loop to be the number of times according to the number of pages after output, the number of pages other than the integer multiple of the number of pages of the original file 60 can be specified as the number of pages after output. For example, in the case where thirteen is specified as the number of pages of the new file 62 when the number of pages of the original file 60 is five, the inner loop may be repeated three times at the time of the last loop of the outer loop.

4. Detailed Flow of File Generation Process

Hereinafter, the reuse information creation process (step S30) and the page duplication process (step S40) in the file generation process will be described in greater detail.

4.1 Reuse Information Creation Process

Figure 6:
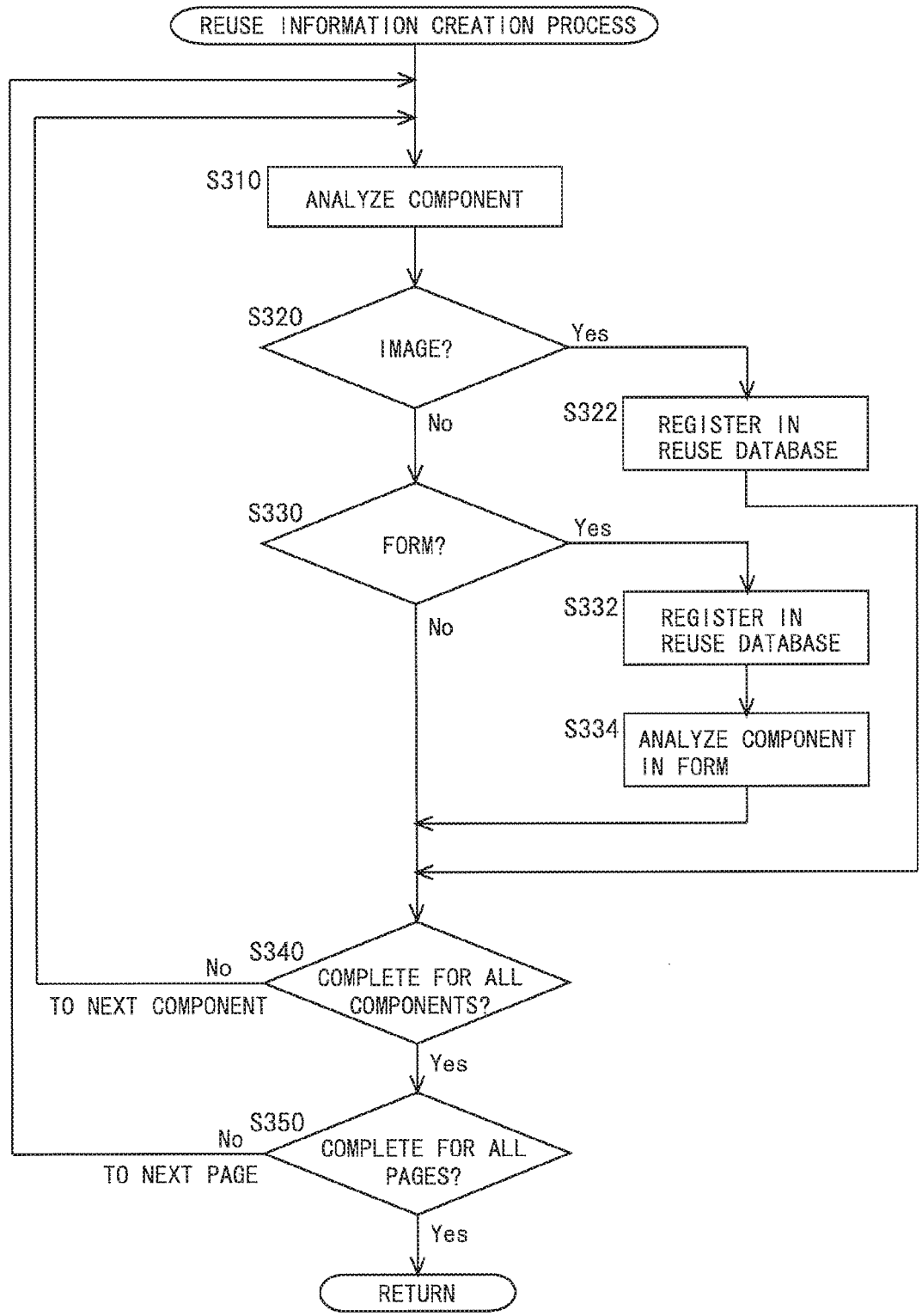
FIG. 6 is a flowchart showing a detailed flow of a reuse information creation process according to the embodiment.

FIG. 6 is a flowchart showing a detailed flow of the reuse information creation process according to the present embodiment. In the reuse information creation process, the initial file 61 described above is used as input data. When the reuse information creation process is started, a process (component analysis) of analyzing the type of a component is performed for each component on each page (step S310). In the component analysis in step S310, whether an analysis target component is held as a resource (image or form) or not is determined. Processes from step S320 are performed only for an analysis target component which is held as a resource.

In step S320, whether the analysis target component is an image or not is determined. As a result of determination, if the analysis target component is an image, the process proceeds to step S322, and if the analysis target component is not an image, the process proceeds to step S330. In step S322, information indicating that the analysis target component is an image and various pieces of information about the component are registered in the reuse database 241. After step S322 is ended, the process proceeds to step S340.

In step S330, whether the analysis target component is a form or not is determined. As a result of determination, if the analysis target component is a form, the process proceeds to step S332, and if the analysis target component is not a form, the process proceeds to step S340. In step S332, information indicating that the analysis target component is a form and various pieces about the component are registered in the reuse database 241. Furthermore, a component in the form which is the analysis target component is analyzed, and information about the component in the form is also registered in the reuse database 241 (step S334). That is, if a form is included in the form, a process of analyzing the component in the form is recursively performed. After step S334 is ended, the process proceeds to step S340.

In step S340, whether the analysis is complete for all the components on the analysis target page is determined. As a result of determination, if the analysis is complete for all the components, the process proceeds to step S350. On the other hand, if there is a component for which the analysis is not complete, the process returns to step S310, and a next component is analyzed.

In step S350, whether the process is complete for all the pages is determined. As a result of determination, if there is a page which is not yet processed, the process returns to step S310, and the process is performed for a next page. On the other hand, if the process is complete for all the pages, the reuse information creation process is ended, and the process proceeds to step S40 in FIG. 4.

FIG. 7 is a diagram showing a part of data (reuse information) that is stored in the reuse database 241 by the reuse information creation process. It should be noted that, here, the reuse information creation process is assumed to be performed taking, as input data, the initial file 61 which is a duplicate of sample data (original file 60) having a structure shown in FIG. 30. In the following, a description of the reuse information will be given. In FIG. 7, pieces of data denoted by reference signs 6a, 6b, and 6c are pieces of reuse information for an image IM1, a form FM2, and a form FM11 in FIG. 30, respectively.

The total number of pages of the initial file 61 is indicated by "TotalPage". In the example shown in FIG. 7, the total number of pages is four. The number of types of forms used in the initial file 61 (i.e., the number of forms registered as resources) is indicated by "TotalForm". In the example shown in FIG. 7, the number of types is five. The number of types of images used in the initial file 61 (i.e., the number of images registered as resources) is indicated by "TotalImage". In the example shown in FIG. 7, the number of types is one.

A serial number assigned to each resource is indicated by "SerialNumber". A resource identification number described above is indicated by "XObjectID". The type of each resource is indicated by "XObjectType". The number of uses of each resource is indicated by "RecycleCount". In the present embodiment, the use state of each resource is determined based on this RecycleCount. The number of a page where each component is used and the number of uses of the component on the page are indicated by "ExecCountList". With respect to this point, of [a b], "a" indicates the number of the page where each resource is used, and "b" indicates the number of times the resource is used on the page. For example, data indicated by an arrow denoted by a reference sign 65 in FIG. 7 indicates that the corresponding resource is used once on page 1, and once on page 2. The number of parent forms of each resource is indicated by "ParentXObjectNum".

4.2 Page Duplication Process

Figure 8:
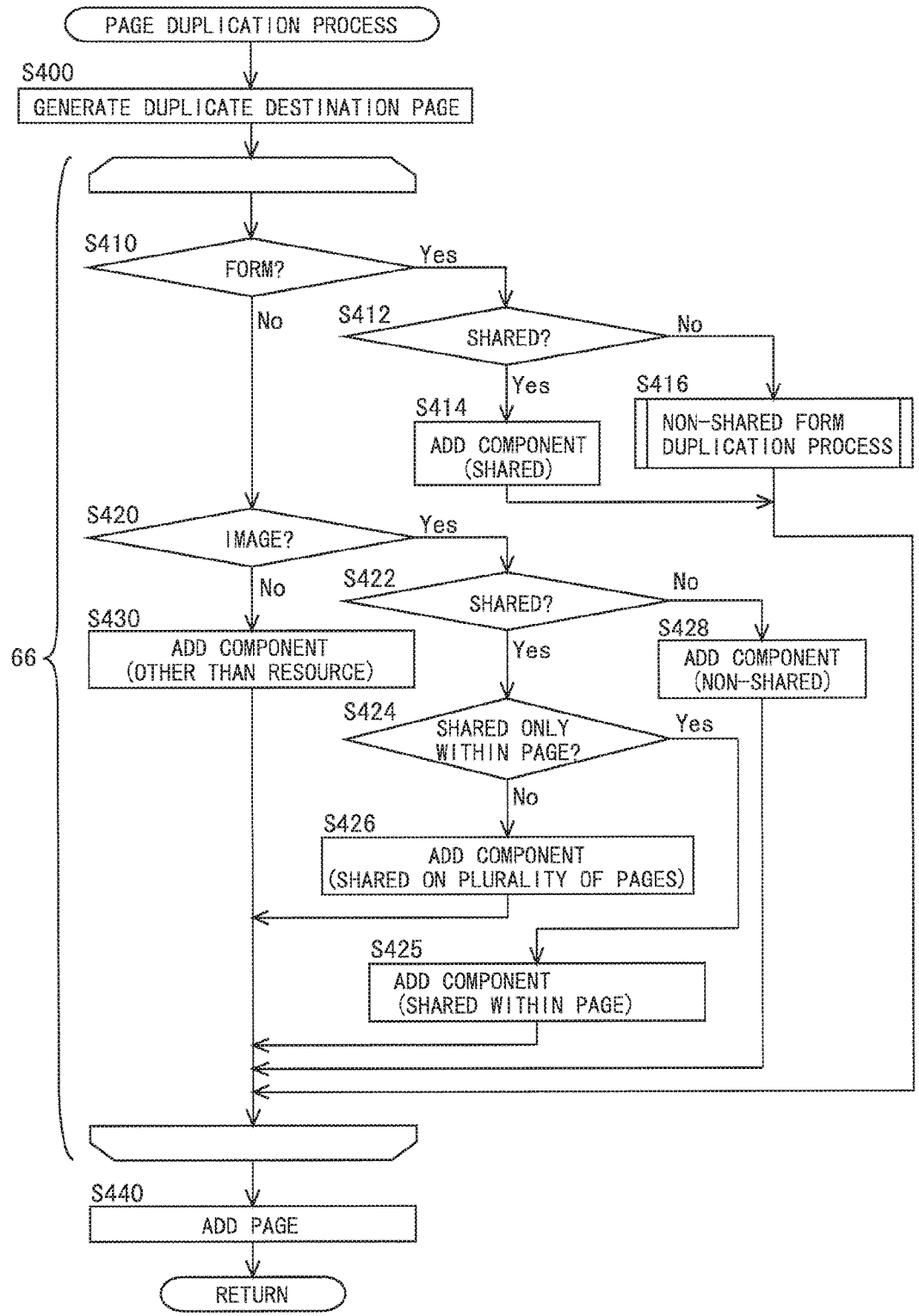
FIG. 8 is a flowchart showing a detailed flow of a page duplication process according to the embodiment.

FIG. 8 is a flowchart showing a detailed flow of the page duplication process according to the present embodiment. When the page duplication process is started, first, a new page as a duplicate destination page is generated (step S400). In processes from step S410 described later, a component included on a duplicate source page is duplicated on the page generated in step S400.

Next, a loop process indicated by a reference sign 66 is performed. The loop process is repeated the same number of times as the number of components included on the duplicate source page (excluding components included in forms). That is, components included on the duplicate source page are each taken as a processing target component, and the process is performed on one component (processing target component) in one loop process. It should be noted that, in the case where a non-shared form duplication process described later is performed, the process is performed also on components included in a corresponding non-shared form.

In step S410, whether a processing target component is a form or not is determined. As a result of determination, if the processing target component is a form, the process proceeds to step S412, and if the processing target component is not a form, the process proceeds to step S420. In step S420, whether the processing target component is an image or not is determined. As a result of determination, if the processing target component is an image, the process proceeds to step S422, and if the processing target component is not an image, the process proceeds to step S430. Accordingly, in the case where the processing target component is neither a form nor an image, the process proceeds to step S430. Then, in step S430, a component (in this case, a character, a line or the like) corresponding to the processing target component is added to the duplicate destination page.

In step S412, whether the use state of a resource corresponding to the processing target component (in this case, a form) is the shared state or the non-shared state is determined based on the reuse information. At this time, data about the processing target component in the reuse database 241 is referred to, and if the value of RecycleCount is two or more, the use state of the resource corresponding to the processing target component is determined to be the shared state, and if the value of RecycleCount is one, the use state of the resource corresponding to the processing target component is determined to be the non-shared state. As a result of determination in step S412, if the use state of the resource corresponding to the processing target component is the shared state, the process proceeds to step S414, and if the use state of the resource corresponding to the processing target component is the non-shared state, the process proceeds to step S416.

In step S414, the component (in this case, a form) corresponding to the processing target component is added to the duplicate destination page. At this time, the form is not registered as a new resource, and the form as the component to be added to the duplicate destination page shares the same resource with a duplicate source form. That is, the use state, in the new file 62, of the resource corresponding to the component that is added to the duplicate destination page is the shared state.

In step S416, a non-shared form duplication process of duplicating the form (non-shared form), the use state of which is determined in step S412 to be the non-shared state, in the duplicate destination page is performed. The form is duplicated together with a component present in the form. A detailed description of the non-shared form duplication process will be given later.

In step S422, whether the use state of a resource corresponding to the processing target component (in this case, an image) is the shared state or the non-shared state is determined based on the reuse information. Determination in step S422 is performed in the same manner as determination in step S412. As a result of determination in step S422, if the use state of the resource corresponding to the processing target component is the shared state, the process proceeds to step S424, and if the use state of the resource corresponding to the processing target component is the non-shared state, the process proceeds to step S428.

In step S424, whether the image as the resource corresponding to the processing target component (hereinafter, such an image will be referred to as a "processing target image") is used only on one page or not is determined. As a result of determination, if the processing target image is used only on one page, the process proceeds to step S425, and if the processing target image is used on a plurality of pages, the process proceeds to step S426.

In step S425, addition of the component (in this case, an image) to the duplicate destination page is performed in such a way that the resource corresponding to the component (component corresponding to the processing target component) to be added to the duplicate destination page will be used only on the duplicate destination page. More specifically, in the case where K images (where K is an integer of two or more), which are components, are shared on one page, at the time of processing a first image among the K images, a new image as a resource is registered, and then, a component which uses the newly registered image as the resource is added to the duplicate destination page, and at the time of processing the remaining (K−1) images, components which use the image newly registered at the time of processing of the first image as the resource are added to the duplicate destination page. In this manner, a resource corresponding to a component to be added to the duplicate destination page is newly generated, and the newly generated resource is shared in the new file 62 only on the duplicate destination page.

Figure 9:
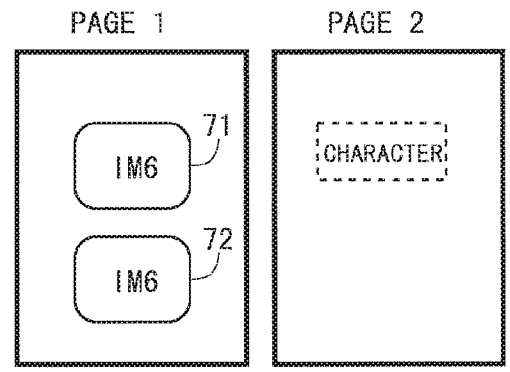
FIG. 9 is a diagram for describing a process for a case where an image is shared only on one page according to the embodiment.
Figure 10:
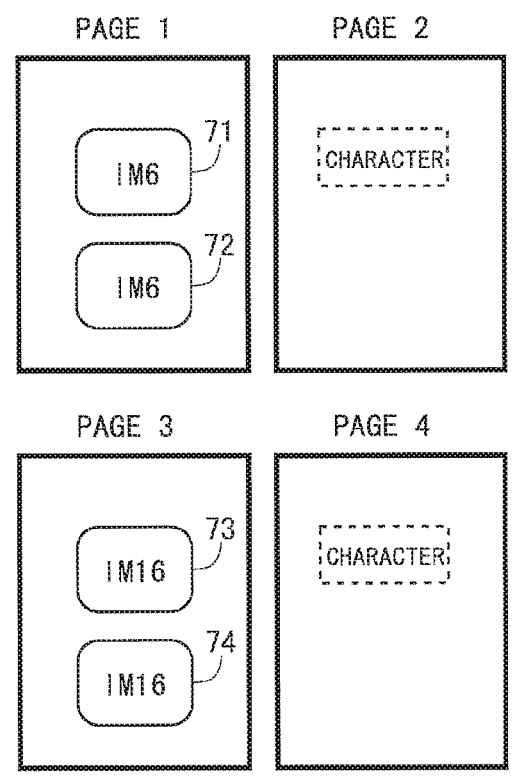
FIG. 10 is a diagram for describing the process for the case where an image is shared only on one page according to the embodiment.

For example, as shown in FIG. 9, it is assumed that an image IM6 is shared only on page 1. It should be noted that, in order to distinguish between the two images IM6, one is denoted by a reference sign 71, and the other is denoted by a reference sign 72 (in the same manner, also in FIGS. 10 to 12, each image is denoted by a reference sign beginning with "IM" and another reference sign). In this example, page 3 as shown in FIG. 10 is generated by the file generation process based on page 1. As shown in FIG. 10, a resource of images 73, 74 on page 3 is different from a resource of images 71, 72 on page 1. Furthermore, an image IM16 is shared only on page 3. In this manner, a use state that an image is shared only on one page is maintained before and after the file generation process.

In step S426, the component (in this case, an image) corresponding to the processing target component is added to the duplicate destination page. At this time, the image is not registered as a new resource, and the image as a component to be added to the duplicate destination page shares the same resource as the duplicate source image. That is, the use state, in the new file 62, of the resource corresponding to the component that is added to the duplicate destination page is the shared state.

Figure 11:
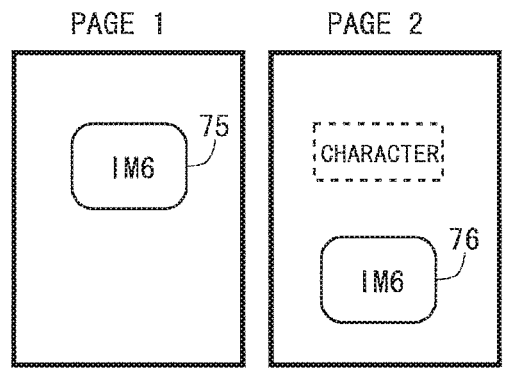
FIG. 11 is a diagram for describing a process for a case where an image is shared by a plurality of pages according to the embodiment.
Figure 12:
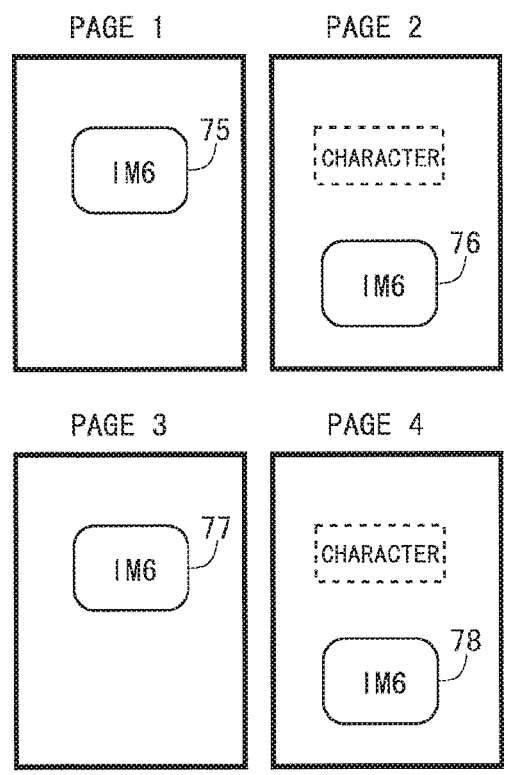
FIG. 12 is a diagram for describing the process for the case where an image is shared by a plurality of pages according to the embodiment.

For example, as shown in FIG. 11, it is assumed that an image IM6 is shared by page 1 and page 2. In this example, page 3 as shown in FIG. 12 is generated based on page 1, and page 4 as shown in FIG. 12 is generated based on page 2. As shown in FIG. 12, images 75 to 78 provided, respectively, on pages 1 to 4 share a same resource. Accordingly, a use state that the image is shared by pages is maintained before and after the file generation process.

In step S428, the component (in this case, an image) corresponding to the processing target component is added to the duplicate destination page. At this time, the image is registered as a new resource. That is, the use state, in the new file 62, of the resource corresponding to the component that is added to the duplicate destination page is the non-shared state.

When the process of adding to the duplicate destination page is complete for all the components on the duplicate source page (that is, when the loop process indicated by the reference sign 66 is ended), the process proceeds to step S440. In step S440, the duplicate destination page generated in the above manner is added to the new file 62.

It should be noted that, in the present embodiment, a first component type confirmation step is realized by step S410, a form use state determination step is realized by step S412, a second component type confirmation step is realized by step S420, a first image use state determination step is realized by step S422, and a second image use state determination step is realized by step S424. Furthermore, a component addition step is realized by step S414, step S425, step S426, step S428, step S430, and step S540 (see FIG. 13), described later, in the non-shared form duplication process (step S416).

4.3 Non-Shared Form Duplication Process

Figure 13:
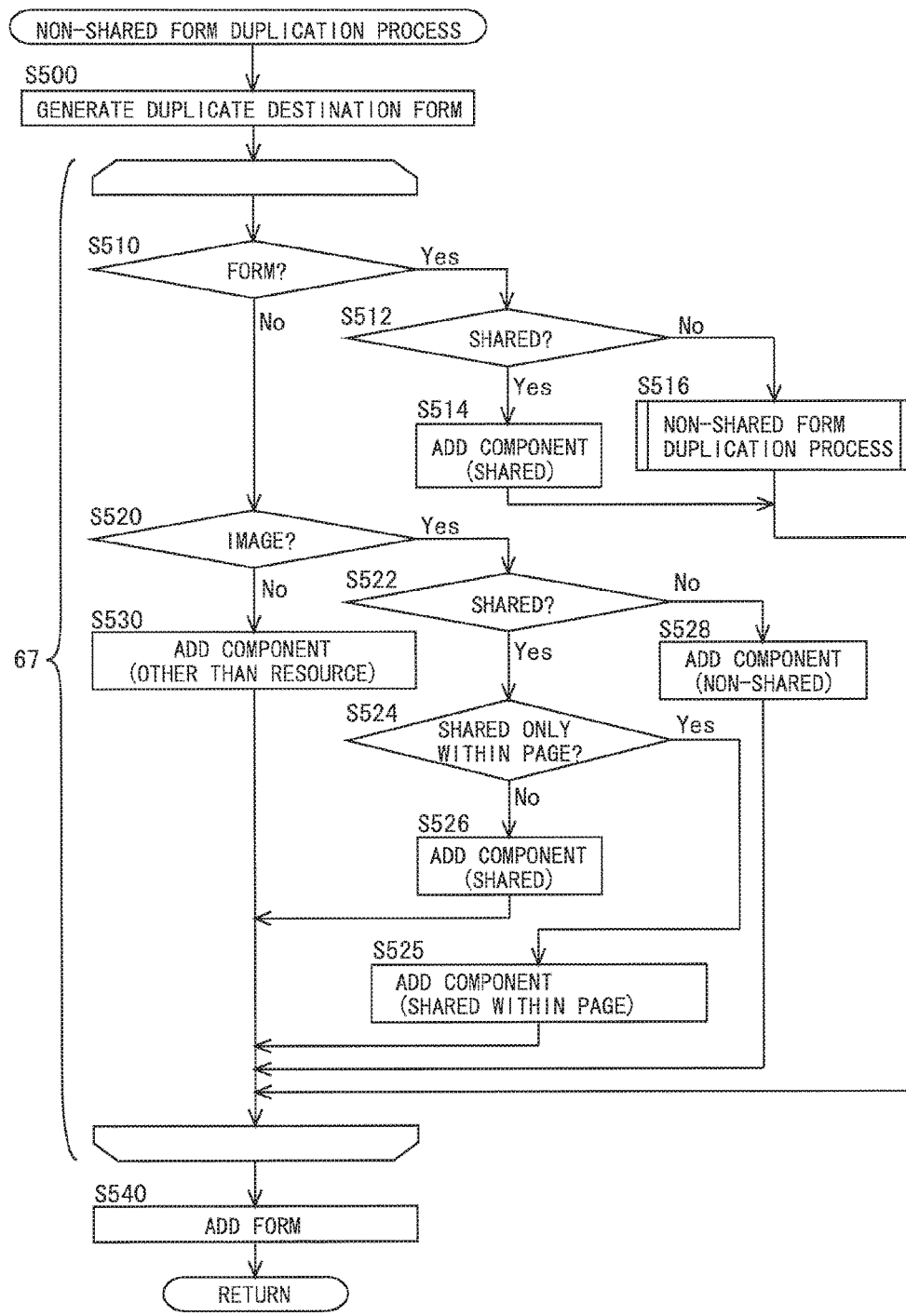
FIG. 13 is a flowchart showing a detailed flow of a non-shared form duplication process according to the embodiment.

FIG. 13 is a flowchart showing a detailed flow of the non-shared form duplication process. When the non-shared form duplication process is started, first, a new form as a duplicate destination form (a form corresponding to the form as the processing target component in the page duplication process shown in FIG. 8) is generated (step S500). In processes from step S510 described later, a component in a duplicate source form (the form as the processing target component in the page duplication process shown in FIG. 8) is duplicated in the form generated in step S500.

Next, a loop process indicated by a reference sign 67 is performed. The loop process is repeated the same number of times as the number of components included on the duplicate source page (excluding components included in a form in the duplicate source form). That is, components included in the duplicate source form are each taken as a processing target component, and the process is performed on one component (processing target component) in one loop process. However, in the case where the non-shared form duplication process (process in step S516) is recursively performed in the non-shared form duplication process, the process is performed also on components included in the corresponding non-shared form.

In steps S510 to S530, the same processes as those in steps S410 to S430 (see FIG. 8) are performed. However, addition of a component corresponding to the processing target component is performed on the duplicate source form. Furthermore, in step S516, the same process as this non-shared form duplication process is recursively performed. That is, in the case where a form, the use state of which is the non-shared state, is recursively included in a form, the use state of which is the non-shared state, the non-shared form duplication process is recursively performed.

When the process of adding to the duplicate destination form is complete for all the components included in the duplicate source form (that is, when the loop process indicated by the reference sign 67 is ended), the process proceeds to step S540. In step S540, the duplicate destination form generated in the above manner is added to the duplicate destination page.

4.4 Specific Example of File Generation Process

Next, a specific example of the file generation process (particularly, a specific example of the page duplication process) will be described.

4.4.1 First Specific Example

Figure 30:
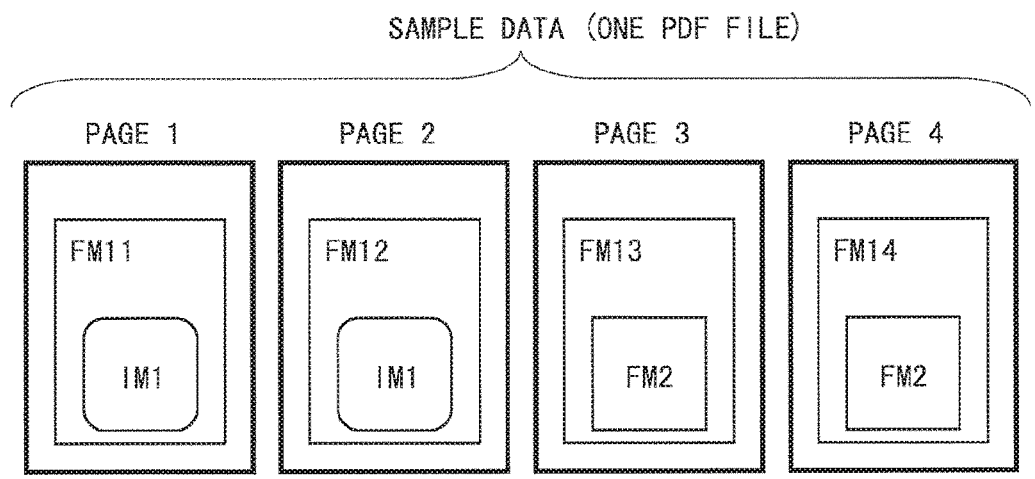
FIG. 30 is a diagram showing an example of sample data.
Figure 31:
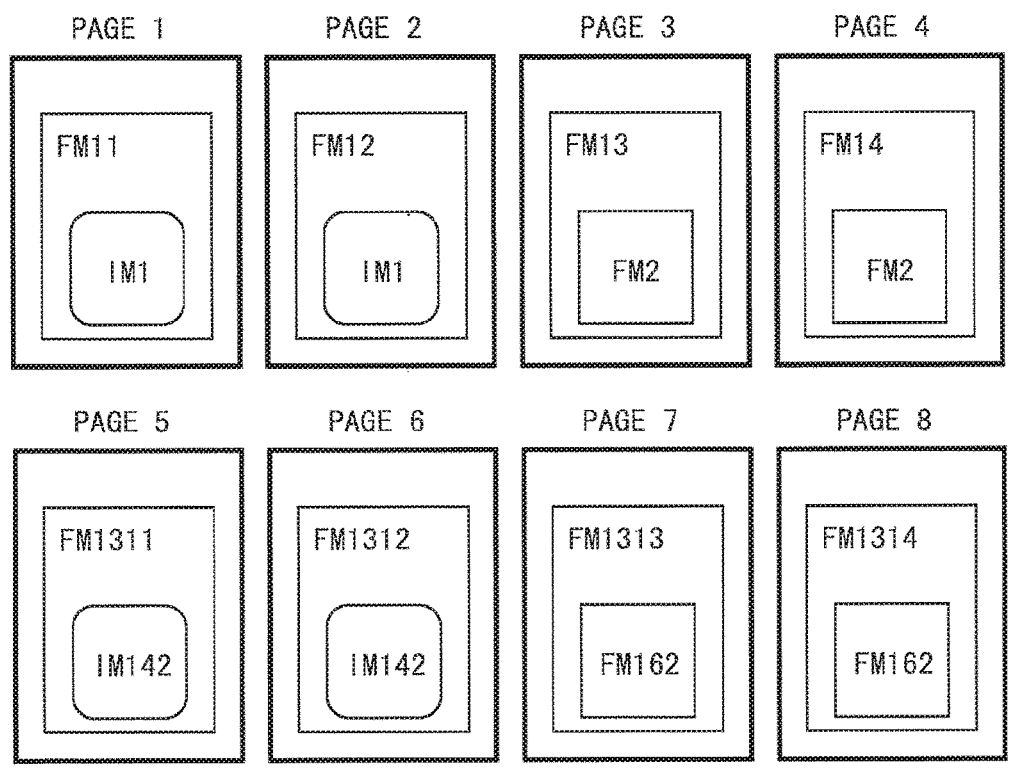
FIG. 31 is a diagram for describing a first conventional technique for increasing the number of pages.
Figure 32:
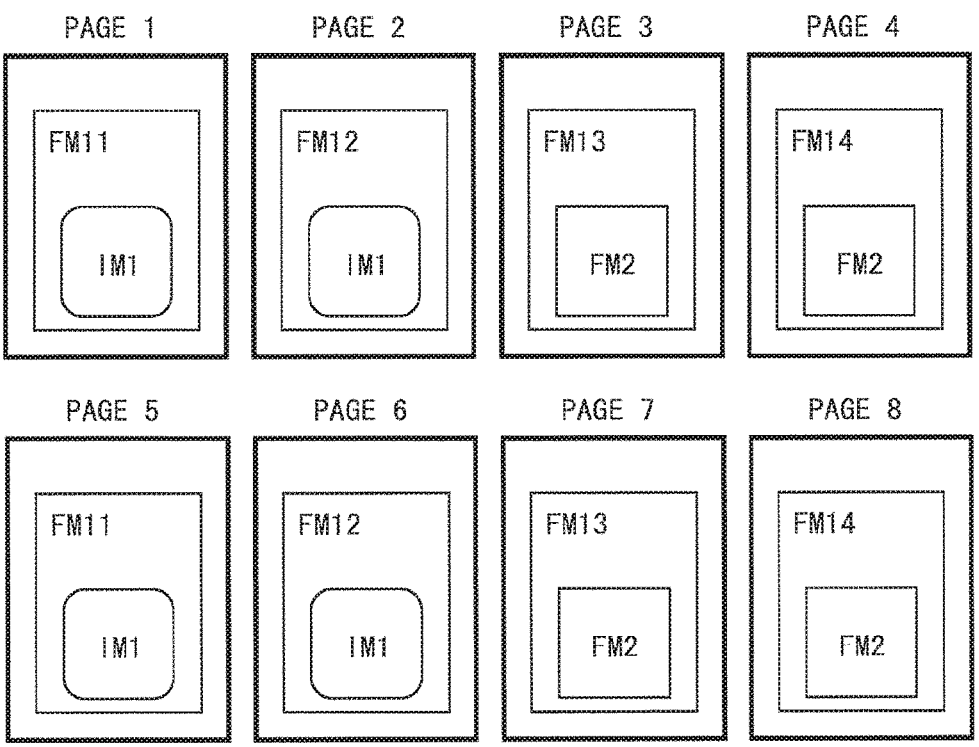
FIG. 32 is a diagram for describing a second conventional technique for increasing the number of pages.

As a first specific example, an example of doubling the number of pages included in sample data (one PDF file) shown in FIG. 30 will be described. In this example, a new file 62 having eight pages is generated from an original file 60 having four pages. It should be noted that page 5 to page 8 of the new file 62 are generated based, respectively, on page 1 to page 4 of an initial file 61, which is a duplicate of the original file 60. In this case, the focus is on the page duplication process for generating page 5 of the new file 62 from page 1 of the initial file 61. It should be noted that data denoted by a reference sign 6c in FIG. 7 is the reuse information about a form FM11, and data denoted by a reference sign 6a in FIG. 7 is the reuse information about an image IM1.

Figure 14:
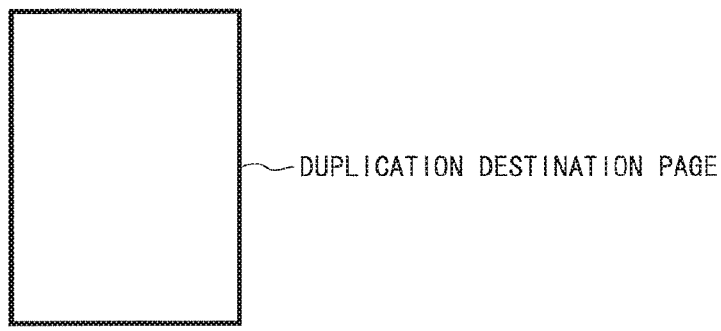
FIG. 14 is a diagram for describing a first specific example of the file generation process (example of increasing the number of pages from four to eight) according to the embodiment.
Figure 15:
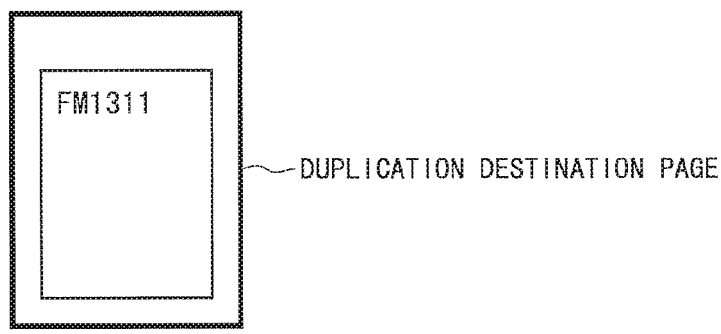
FIG. 15 is a diagram for describing the first specific example of the file generation process according to the embodiment.
Figure 16:
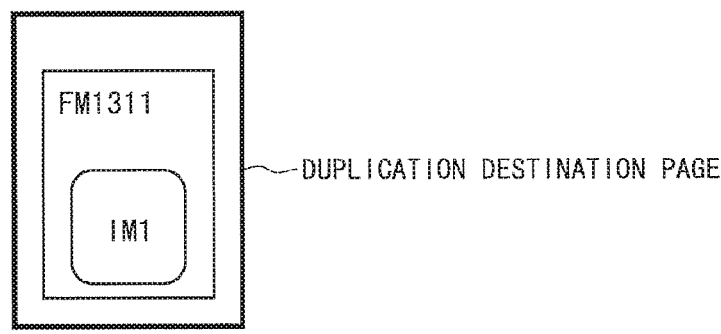
FIG. 16 is a diagram for describing the first specific example of the file generation process according to the embodiment.

First, a new page (duplicate destination page) as shown in FIG. 14 is generated. Next, referring to the reuse information about the form FM11 (see FIG. 7), the value of RecycleCount is one. That is, the use state of the form FM11 is the non-shared state. Accordingly, a new form FM1311 is generated as the resource, and the form FM1311 is added to the duplicate destination page, as shown in FIG. 15. Next, referring to the reuse information about the image IM1, the value of RecycleCount is two. That is, the use state of the image IM1 is the shared state. Accordingly, as shown in FIG. 16, the image IM1 as a component is added to the duplicate destination page in the manner of reusing the image IM1 as the resource.

As described above, with respect to the duplicate source page, the use state of the form FM11 is the non-shared state, and the use state of the image IM1 is the shared state. Referring to page 1 in FIG. 30 and FIG. 16, the form FM11 as a component on the duplicate source page and the form FM1311 as a component on the duplicate destination page do not share the resource. Moreover, the image IM1 as a component on the duplicate source page and the image IM1 as a component on the duplicate destination page share the resource. In this manner, page duplication is performed in such a way that the use state of each resource is the same before duplication and after duplication.

In the same manner, page 6 to page 8 of the new file 62 are generated based, respectively, on page 2 to page 4 of the initial file 61, and the new file 62 having a structure as shown in FIG. 17 is finally generated. By comparing page 1 to page 4 with page 5 to page 8, it can be seen that page duplication is performed in such a way that the use state of each resource is the same before duplication and after duplication.

4.4.2 Second Specific Example

Next, as a second specific example, an example of doubling the number of pages included in sample data (one PDF file) shown in FIG. 18 will be described. In this example, a new file 62 having ten pages is generated from an original file 60 having five pages. It should be noted that page 6 to page 10 of the new file 62 are generated based, respectively, on page 1 to page 5 of an initial file 61, which is a duplicate of the original file 60. In this case, the focus is on the page duplication process for generating page 6 of the new file 62 from page 1 of the initial file 61. The use state of a form FM11 is the non-shared state, the use state of a form FM20 is the shared state, and the use state of an image IM1 is the shared state. Furthermore, an image IM21 is shared only on one page. It should be noted that the reuse information which is created based on the sample data shown in FIG. 18 is shown in FIG. 19.

Figure 23:
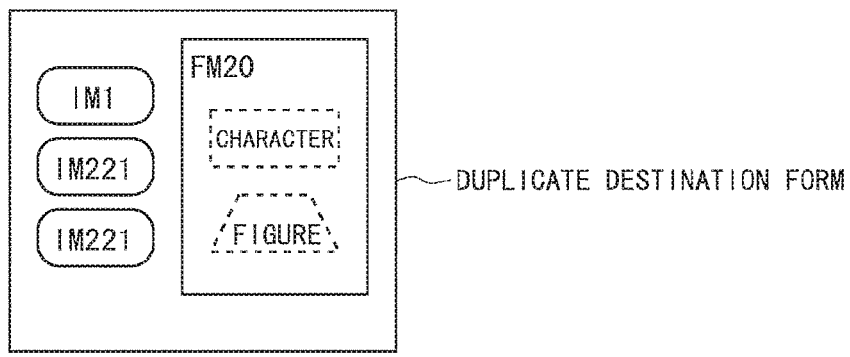
FIG. 23 is a diagram for describing the second specific example of the file generation process according to the embodiment.
Figure 24:
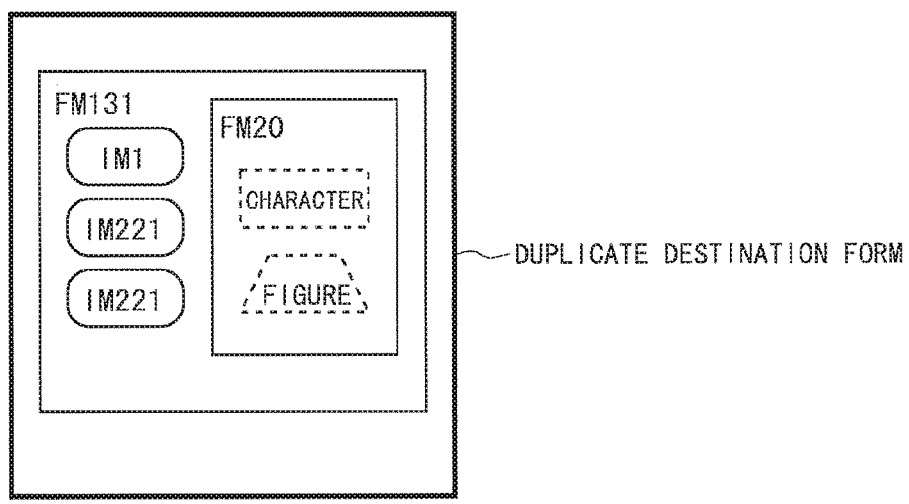
FIG. 24 is a diagram for describing the second specific example of the file generation process according to the embodiment.

First, a new page (duplicate destination page) as shown in FIG. 14 is generated. Next, because the use state of the form FM11 is the non-shared state, the non-shared form duplication process is performed. In the non-shared form duplication process, first, a form as shown in FIG. 20 obtained by removing components in the form FM11 from the form FM11 is generated as a duplicate destination form. Then, because the use state of the image IM1 is the shared state, and the image IM1 is shared by a plurality of pages, the image IM1 as a component is added to the duplicate destination form in the manner of reusing the image IM1 as the resource, as shown in FIG. 21. Furthermore, because the use state of the image IM21 is the shared state, and the image IM21 is shared only on one page, a new image IM221 as a resource is generated. Then, as shown in FIG. 22, two images IM221 as components are added to the duplicate destination page. Next, because the use state of the form FM20 is the shared state, the form FM20 as a component is added to the duplicate destination form in the manner of reusing the form FM20 as the resource, as shown in FIG. 23. Then, the duplicate destination form generated in the above manner is made a form FM131 as a new resource, and the form FM131 is added to the duplicate destination page, as shown in FIG. 24.

As described above, with respect to the duplicate source page, the use state of the form FM11 is the non-shared state, and the use state of the form FM20 is the shared state. Moreover, the use states of the image IM1 and the image IM21 are both the shared states. While the image IM1 is shared by a plurality of pages, the image IM21 is shared only on one page. Referring to page 1 in FIG. 18 and FIG. 24, the form FM11 as a component on the duplicate source page and the form FM131 as a component on the duplicate destination page do not share the resource. Moreover, the form FM20 as a component on the duplicate source page and the form FM20 as a component on the duplicate destination page share the resource. Furthermore, the image IM1 as a component on the duplicate source page and the image IM1 as a component on the duplicate destination page share the resource. Furthermore, the images IM21 on the duplicate source page share the resource only on one page, and the images IM221 on the duplicate destination page also share the resource only on one page. In this manner, page duplication is performed in such a way that the use state of each resource is the same before duplication and after duplication.

Figure 25:
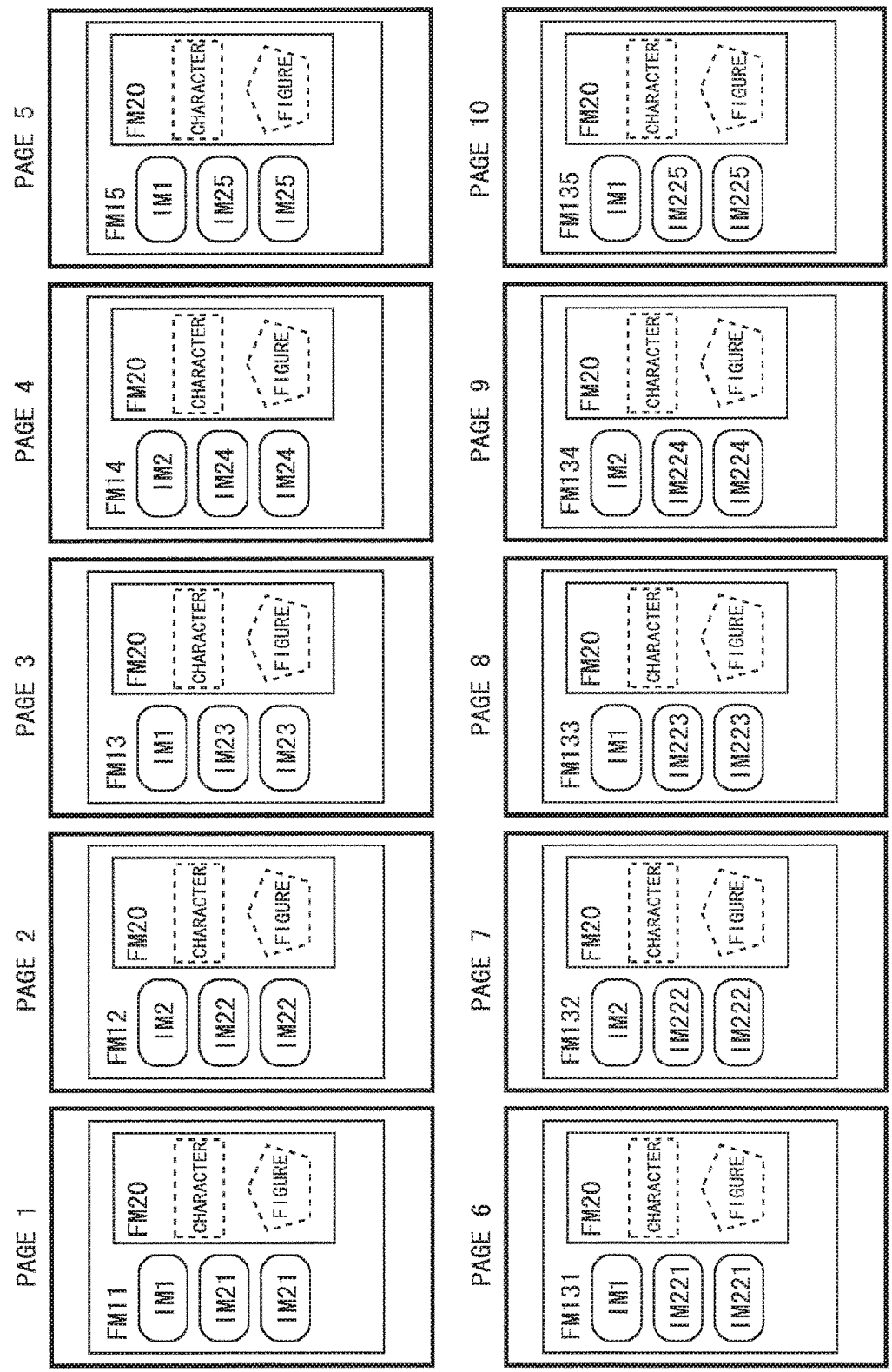
FIG. 25 is a diagram for describing the second specific example of the file generation process according to the embodiment.
Figure 26:
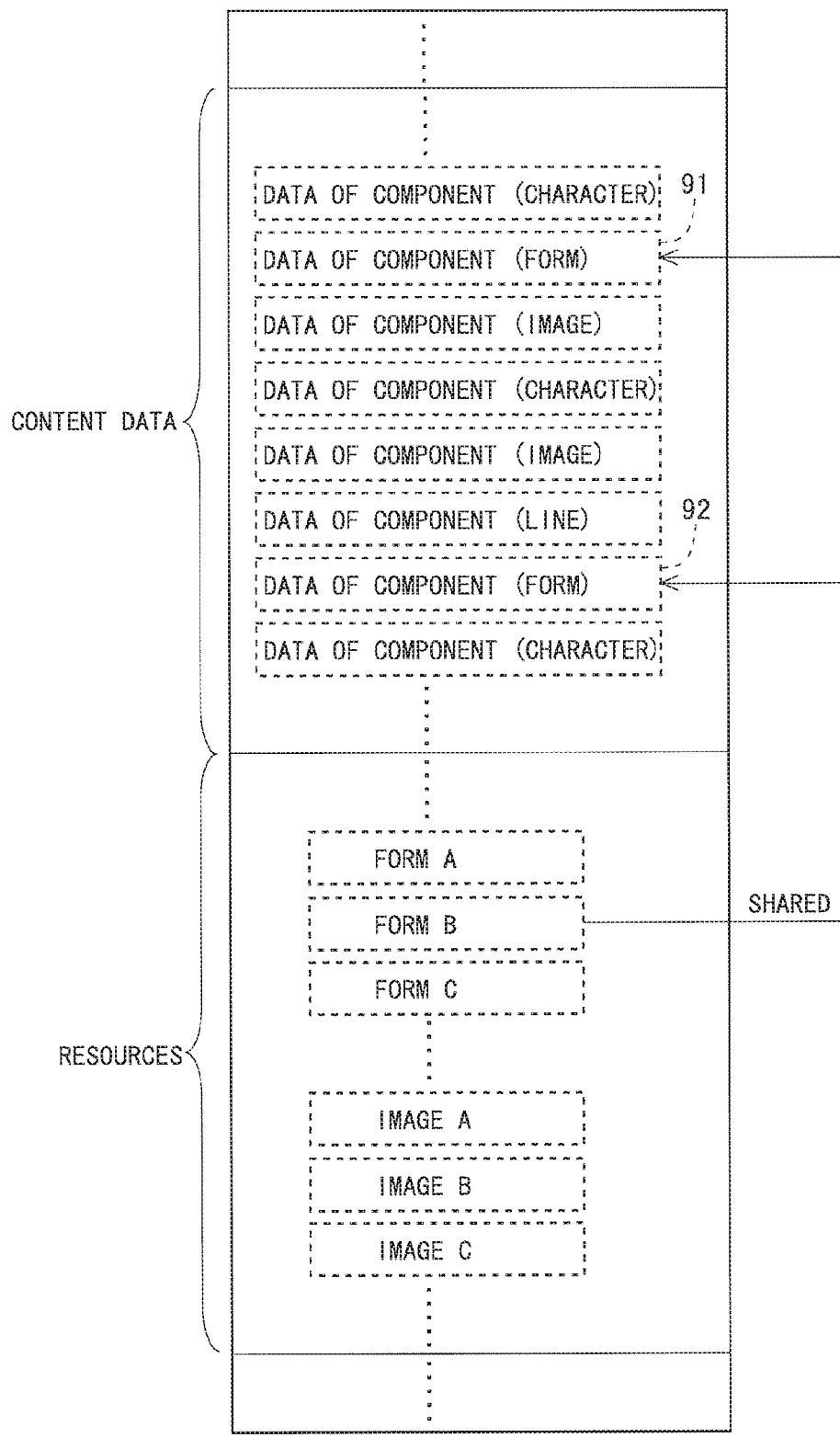
FIG. 26 is a diagram for describing drawing objects constituting a PDF file.
Figure 27:
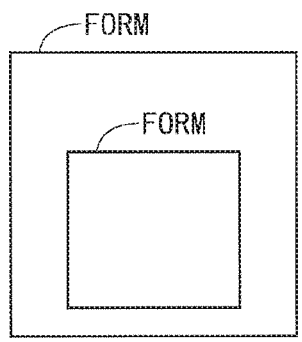
FIG. 27 is a diagram for describing drawing objects constituting a PDF file.
Figure 28:
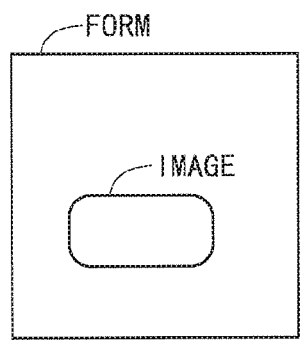
FIG. 28 is a diagram for describing drawing objects constituting a PDF file.
Figure 29:
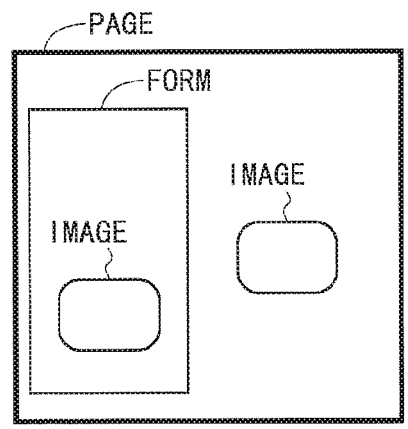
FIG. 29 is a diagram for describing drawing objects constituting a PDF file.

In the same manner, page 6 to page 10 of the new file 62 are generated based, respectively, on page 2 to page 5 of the initial file 61, and the new file 62 having a structure as shown in FIG. 25 is finally generated. By comparing page 1 to page 5 with page 6 to page 10, it can be seen that page duplication is performed in such a way that the use state of each resource is the same before duplication and after duplication.

5. Effects

According to the present embodiment, in the case where data with a small number of pages is used as test sample data (PDF file) in the printing system, for example, the file generation process, which is a process of increasing the number of pages of the sample data, may be performed. In the file generation process, the reuse information for specifying the use state of each resource is created by analyzing the initial file 61, which is a duplicate of the original file (sample data) 60. Then, a page which constitutes the new file 62 is generated by performing, based on the reuse information, duplication of a page in the initial file 61 in such a way that the use state of each resource is the same before duplication and after duplication. That is, the use state of a resource, the use state of which before duplication is the shared state, remains the shared state after duplication, and the use state of a resource, the use state of which before duplication is the non-shared state, remains the non-shared state after duplication. Accordingly, the file (new file 62) generated in the file generation process according to the present embodiment has a data structure similar to that of the file storing actual data. Accurate prediction of the RIP time using the new file 62 is enabled by performing duplication of the page in the initial file 61 until the number of pages of the new file 62 is such that estimation of the RIP time is enabled. As described above, according to the present embodiment, a PDF file enabling accurate estimation of the RIP time can be generated from a PDF file with a small number of pages.

6. Modifications, Etc

The present invention is not limited to the embodiment described above, and various modifications may be made without departing from the scope of the present invention. For example, although a description is given of an example of performing the file generation process (process of generating, based on an original file 60 in a PDF format, a new file 62 in a PDF format having a larger number of pages than the original file 60) by the print data processing device 200 in the embodiment described above, the device for performing the file generation process is not particularly limited. For example, the file generation process may be performed by the client computer 100 (see FIG. 1).

Furthermore, the configuration may be such that, in the case where the number of pages of a file inputted to a system for predicting the RIP time is smaller than a predetermined number of pages, the file generation process is automatically executed, without operation of an operator, before execution of the process for predicting the RIP time.

The present invention is described above in detail, but the description is illustrative in all aspects and is not restrictive. Numerous other changes and modifications are conceivable without departing from the scope of the present invention.

The present application claims priority to Japanese Patent Application No. 2017-166538 filed on Aug. 31, 2017 and entitled "file generation method and file generation program", the entire contents of which are incorporated herein by reference.

What is claimed is:

1. A method for estimating RIP time required for a RIP processing in a print data processing device configured to generate print data in a bitmap format by performing the RIP processing on submission data that is a file in a PDF format, the print data being to be sent to a printer, the file in the PDF format describing a print target by a page description language, the method comprising:

specifying, as an original file in the PDF format, sample data for test printing performed before printing by the printer, creating, by taking the original file or a duplicate of the original file as an initial file and analyzing the initial file, reuse information for allowing specification of whether a use state of each resource held in the initial file is a shared state of being used as a component in one file a plurality of times or a non-shared state of being used as a component in one file only once;

generating a page that constitutes a new file in the PDF format, by performing, based on the reuse information, duplication of a page in the initial file in such a way that the use state of each resource is same before the duplication and after the duplication, the new file having a larger number of pages than the original file; and estimating the RIP time using the new file.

2. The method according to claim 1, further comprising generating the initial file by performing duplication of the original file.

3. The method according to claim 1, wherein resources that are targets of creation of the reuse information are a form and an image.

4. The method according to claim 3, wherein in generating the page that constitutes the new file, a component included in a duplicate source page that is a page constituting the initial file is taken as a processing target component one by one, wherein generating the page that constitutes the new file includes a first component type confirmation step of determining whether the processing target component is a form or not, a form use state determination step of determining, based on the reuse information, whether the use state of a resource corresponding to the processing target component is the shared state or the non-shared state, when the processing target component is determined in the first component type confirmation step to be a form, a second component type confirmation step of determining whether the processing target component is an image or not, a first image use state determination step of determining, based on the reuse information, whether the use state of a resource corresponding to the processing target component is the shared state or the non-shared state, when the processing target component is determined in the second component type confirmation step to be an image, and a component addition step of adding a component corresponding to the processing target component to a duplicate destination page as a page that constitutes the new file, wherein in a case where the use state of the resource corresponding to the processing target component is determined in the form use state determination step or the first image use state determination step to be the shared state, addition of a component to the duplicate destination page is performed in the component addition step in such a way that the use state, in the new file, of a resource corresponding to the component that is added to the duplicate destination page is the shared state, and wherein in a case where the use state of the resource corresponding to the processing target component is determined in the form use state determination step or the first image use state determination step to be the non-shared state, addition of a component to the duplicate destination page is performed in the component addition step in such a way that the use state, in the new file, of a resource corresponding to the component that is added to the duplicate destination page is the non-shared state.

5. The method according to claim 4, further comprising a second image use state determination step of determining, based on the reuse information, whether a processing target image that is the resource corresponding to the processing target component is used only on one page or not, when the use state of the resource corresponding to the processing target component is determined in the first image use state determination step to be the shared state, wherein in a case where the processing target image is determined in the second image use state determination step to be used only on one page, a resource corresponding to the component that is added to the duplicate destination page is newly generated in the component addition step, and the resource that is newly generated is shared, in the new file, only on the duplicate destination page.

6. The method according to claim 4, wherein in a case where the use state of the resource corresponding to the processing target component is determined in the form use state determination step to be the shared state, a component corresponding to each and every component included in the form as the processing target component is further added to the duplicate destination page in the component addition step.

7. The method according to claim 4, further comprising performing, based on the reuse information, duplication of the form as the processing target component in such a way that the use state of a resource corresponding to each component included in the form as the processing target component is same before duplication and after duplication, when the use state of the resource corresponding to the processing target component is determined in the form use state determination step to be the non-shared state.

8. The method according to claim 7, wherein the non-shared form duplication step is recursively performed, in a case where a form, the use state of which is the non-shared state, is recursively included in a form, the use state of which is the non-shared state.

* * * * *